US008647774B2

(12) United States Patent
Inagaki et al.

(10) Patent No.: US 8,647,774 B2
(45) Date of Patent: Feb. 11, 2014

(54) NON-AQUEOUS ELECTROLYTIC BATTERIES CONTAINING AN ACTIVE MATERIAL INCLUDING A MONOCLINIC B-TYPE TITANIUM COMPOSITE OXIDE

(75) Inventors: Hiroki Inagaki, Kawasaki (JP); Keigo Hoshina, Yokohama (JP); Yasuhiro Harada, Yokohama (JP); Yuki Otani, Kawasaki (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/305,043

(22) Filed: Nov. 28, 2011

(65) Prior Publication Data

US 2012/0129016 A1    May 24, 2012

Related U.S. Application Data

(63) Continuation of application No. PCT/JP2009/059800, filed on May 28, 2009.

(51) Int. Cl.
*H01M 4/48*    (2010.01)
*H01M 4/13*    (2010.01)
*H01M 2/22*    (2006.01)

(52) U.S. Cl.
USPC ............... 429/231.5; 429/218.1; 429/158; 252/182.1

(58) Field of Classification Search
None
See application file for complete search history.

(56) References Cited

U.S. PATENT DOCUMENTS

| 8,003,255 B2* | 8/2011 | Inagaki et al. ............. 429/231.1 |
| 2007/0190402 A1 | 8/2007 | Kumeuchi et al. |
| 2008/0113264 A1 | 5/2008 | Inagaki et al. |
| 2011/0052942 A1* | 3/2011 | Inagaki et al. .................... 429/7 |

FOREIGN PATENT DOCUMENTS

| CN | 1838471 A | 9/2006 |
| CN | 101179140 A | 5/2008 |
| JP | 2004-152579 | 5/2004 |
| JP | 2007-087909 | 4/2007 |
| JP | 2007-220409 | 8/2007 |
| JP | 2008-034368 | 2/2008 |
| JP | 2008-117625 | 5/2008 |
| JP | 2009-117259 | 5/2009 |

(Continued)

OTHER PUBLICATIONS

Machine translation of JP 2008-117625, Akimoto et al., May 22, 2008.*

(Continued)

*Primary Examiner* — Kwang Han
(74) *Attorney, Agent, or Firm* — Oblon, Spivak, McClelland, Maier & Neustadt, L.L.P.

(57) ABSTRACT

According to one embodiment, an active material for batteries includes a titanium composite oxide, wherein the titanium composite oxide includes a monoclinic β-type titanium composite oxide as a main phase, and when an integral intensity of the main peak of the monoclinic β-type titanium composite oxide obtained with a wideangle X-ray diffraction method having a CuKα-ray as an X-ray source is 100, the relative value of the integral intensity of the main peak that presents the range of 2θ=25.1 to 25.5° attributed to at least one subphase selected from anatase-type $TiO_2$ and $H_2Ti_8O_{17}$ is 30 or less, and the titanium composite oxide has a crystallite diameter of 5 nm or more as calculated from the main peak of the monoclinic β-type titanium composite oxide obtained with the wideangle X-ray diffraction method.

14 Claims, 7 Drawing Sheets

(56) References Cited

FOREIGN PATENT DOCUMENTS

| JP | 2010-55855 | 3/2010 |
|---|---|---|
| JP | 2010-123401 | 6/2010 |
| WO | WO 2006/033069 A2 | 3/2006 |

OTHER PUBLICATIONS

International Search Report issued Sep. 1, 2009 in PCT/JP2009/059800 filed May 28, 2009.

René Marchand, et al.; "TiO$_2$(B) A New Form of Titanium Dioxide and the Potassium Octatitanate K$_2$Ti$_8$O$_{17}$"; Mat. Res. Bull., 1980, vol. 15, No. 8, pp. 1129-1133.

Japanese Office Action issued Jan. 24, 2012 in Patent Application No. 2011-515810 with English Translation.

Kazuki Chiba et al., "Soft Chemical Synthesis and Electrochemical Properties of Layered Titanates", Proceedings of the 47th Battery Symposium, Nov. 20, 2006, pp. 602-603.

International Preliminary Report on Patentability and Written Opinion issued Sep. 1, 2009, in PCT/JP2009/059800 filed May 28, 2009 (submitting English translation only).

U.S. Appl. No. 13/537,718, filed Jun. 29, 2012, Inagaki, et al.

Combined Office Action and Search Report issued Jul. 16, 2013 in Chinese Patent Application No. 200980158315.6 with English language translation.

* cited by examiner

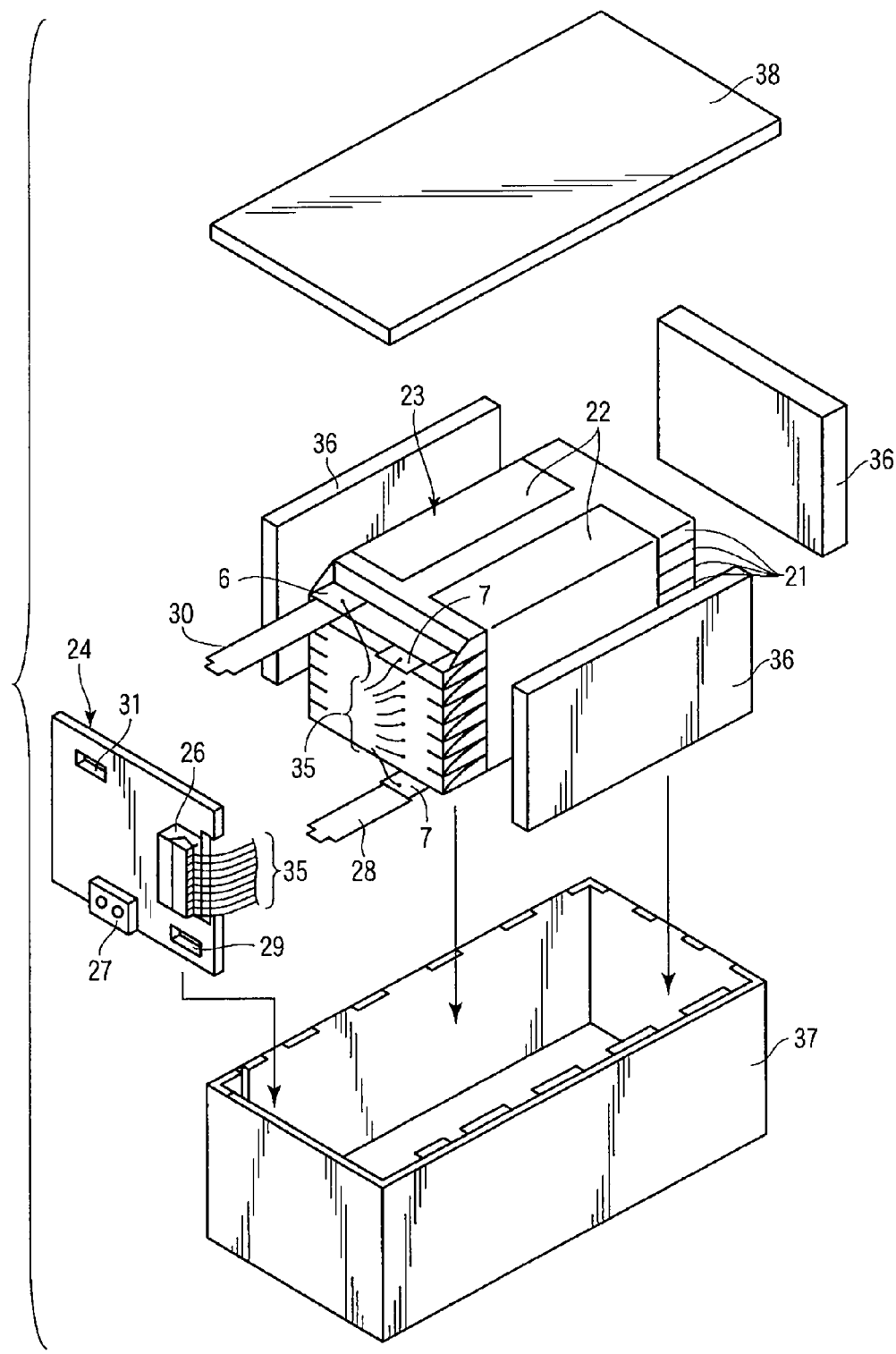
F I G. 3

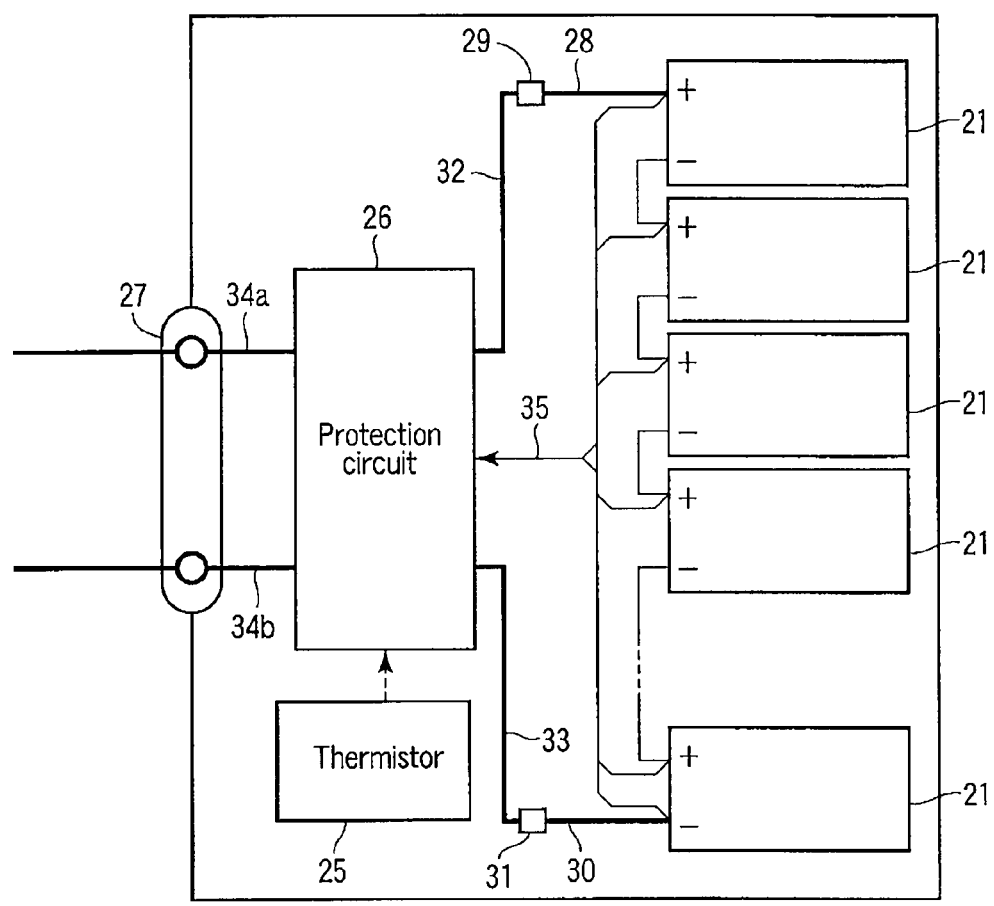
F I G. 4

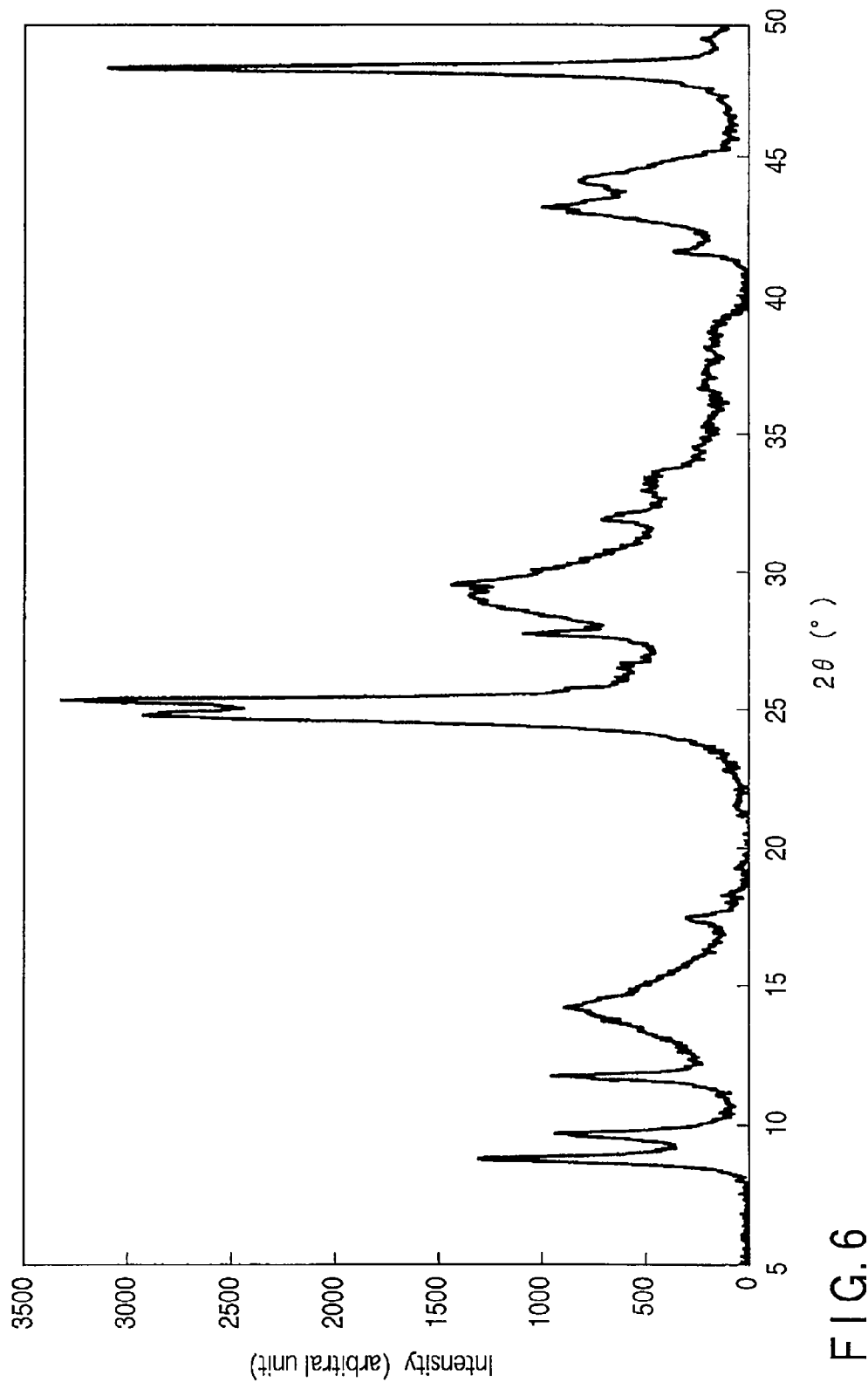
F I G. 6

, # NON-AQUEOUS ELECTROLYTIC BATTERIES CONTAINING AN ACTIVE MATERIAL INCLUDING A MONOCLINIC β-TYPE TITANIUM COMPOSITE OXIDE

CROSS REFERENCE TO RELATED APPLICATIONS

This application is a Continuation Application of PCT Application No. PCT/JP2009/059800, filed May 28, 2009, the entire contents of which are incorporated herein by reference.

FIELD

Embodiments described herein relate generally to an active material for batteries, a non-aqueous electrolyte battery and a battery pack.

BACKGROUND

In recent years, a titanium oxide having a monoclinic β-type structure (represented as $TiO_2$ (B)) has received attention as an active material for non-aqueous electrolyte batteries (see JP-A 2008-34368 (KOKAI), JP-A 2008-117625 (KOKAI) and WO2009/028553A1). In a spinel-type lithium titanate ($Li_4Ti_5O_{12}$) that has been actually used since before, the number of lithium ions that can be inserted and desorbed per a unit chemical formula is three. Therefore, the number of lithium ions that can be inserted and desorbed per one titanium ion was 3/5, and 0.6 was the theoretical maximum. In this regard, the number of lithium ions in $TiO_2$ (B), which can be inserted and released per a titanium ion is 1.0 at the maximum. Therefore, $TiO_2$ (B) has a property that the theoretical capacity is as high as about 335 mAh/g.

BRIEF DESCRIPTION OF THE DRAWINGS

FIG. 3 is an exploded perspective view showing a battery pack of the embodiment;

FIG. 4 is a block drawing of the battery pack of FIG. 3;

FIG. 6 is a drawing showing the X-ray diffraction pattern of a titanium composite oxide of Comparative Example 1;

DETAILED DESCRIPTION

Figure 1:
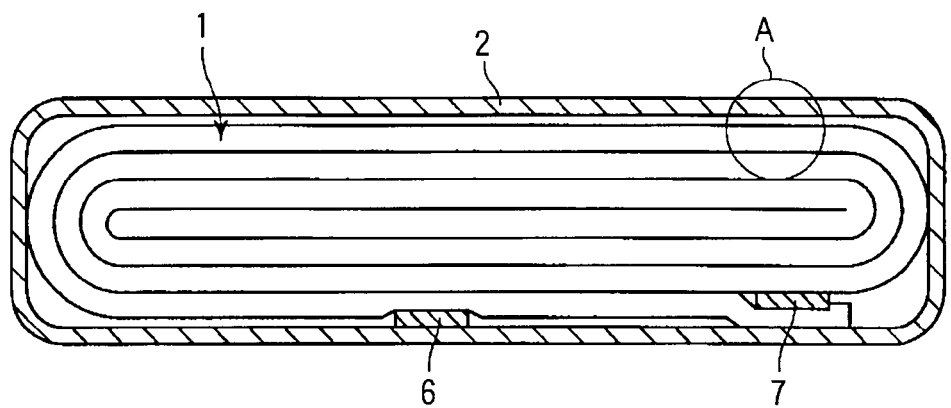
FIG. 1 is a cross-sectional drawing that shows a flat-type non-aqueous electrolyte battery according to the embodiment.

Hereinafter the active material for batteries, non-aqueous electrolyte battery and battery pack according to the embodiments are described below with reference to drawings.

In general, according to an embodiment, an active material for batteries comprises a titanium composite oxide, wherein the titanium composite oxide comprises a monoclinic β-type titanium composite oxide as a main phase, and when an integral intensity of the main peak of the monoclinic β-type titanium composite oxide obtained with a wideangle X-ray diffraction method having a CuKα-ray as an X-ray source is 100, the relative value of the integral intensity of the main peak that presents the range of 2θ=25.1 to 25.5° attributed to at least one sub-phase selected from anatase-type $TiO_2$ and $H_2Ti_8O_{17}$ is 30 or less, and the titanium composite oxide has a crystallite diameter of 5 nm or more as calculated from the main peak of the monoclinic β-type titanium composite oxide obtained with the wideangle X-ray diffraction method.

The above-mentioned wideangle X-ray diffraction method is explained below.

A powder (sample) obtained by pulverizing the titanium composite oxide is filled in a holder having a depth of 0.2 mm of a glass sample plate. The surface of the sample filled in the glass sample plate is smoothed by sufficiently impressing with a finger by using a glass plate from outside. At this time, attention is paid so that the sample is filled sufficiently in the holder part, and care is taken not to cause insufficient filling of the sample (cracking, voids). The sample is filled by an amount that is equivalent to the depth of the glass holder (0.2 mm), and care is taken not to cause concaves and convexes from the base surface of the glass holder due to excess and deficiency of the amount to be filled.

Furthermore, the following method is more preferable for excluding declination of the diffraction ray peak position and change in the intensity ratio due to the method for filling in the glass sample plate. Namely, a pressure of about 250 MPa is applied to the above-mentioned sample for 15 minutes to prepare a pressurized powder pellet having a diameter of 10 mm and a thickness of about 2 mm, and then the surface of the pellet is measured.

The measurement can be performed, for example, under the following conditions.

Measurement Method

A sample is filled in a standard glass holder having a diameter of 25 mm, and a measurement is performed by a wideangle X-ray diffraction method. The measurement apparatus and conditions are shown below.

(1) X-ray diffraction apparatus: D8 ADVANCE (sealed tube type); manufactured by Bruker AXS X-ray source: CuKα-ray (Ni filter was used)
Output: 40 kV, 40 mA
Slit system: Div. Slit; 0.3°
Detector: LynxEye (high-speed detector)
(2) Scanning format: 2θ/θ continuous scanning
(3) Measurement range (2θ): 5 to 100°
(4) Step width (2θ): 0.01712°
(5) Count time: 1 second/step.

The crystallite diameter (crystallite size) of the titanium composite oxide can be calculated by using the Scherrer's equation shown below for the half width of the main peak of the $TiO_2$ (B) obtained with the wideangle X-ray diffraction method.

$$\text{Crystallite size (nm)} = \frac{K\lambda}{\beta \cos\theta}$$

$$\beta = \sqrt{\beta_e^2 - \beta_0^2}$$

In the equation, K=0.9, λ (=0.15406 nm), βe: the half width of the diffraction peak, βo: the corrected value of the half width (0.07°).

Furthermore, the integral intensity can be obtained as follows. With respect to the X-ray diffraction profile after the measurement, a smoothing treatment and a background-removal treatment are conducted continuously. With respect to the obtained profile, peak separation is performed by applying the pseudo-Voigt function, and the peak surface area of Kα1 is defined as the integral intensity.

The crystal structure of the monoclinic titanium dioxide is represented as $TiO_2$ (B). The crystal structure represented by $TiO_2$ (B) belongs to mainly a space group C2/m, and shows the tunnel structure as exemplified in FIG. 8. The specific crystal structure of $TiO_2$ (B) is described in the document of R. Marchand, L. Brohan, M. Tournoux, Material Research.

Figure 8:
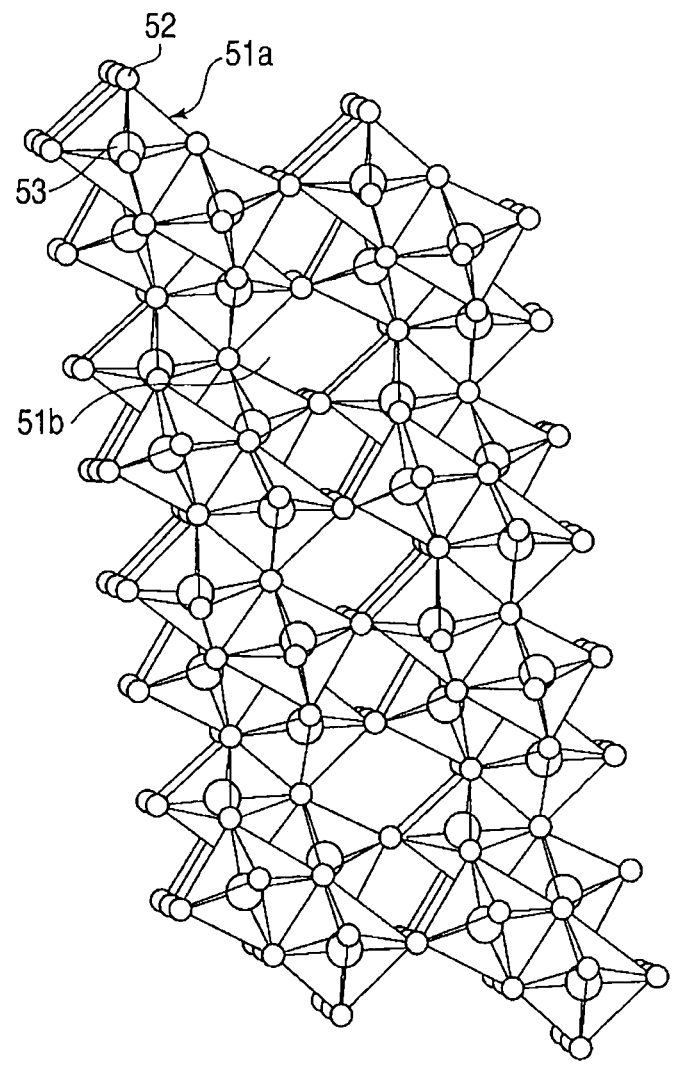
FIG. 8 is a schematic drawing showing the crystal structure of a monoclinic β-type titanium oxide ($TiO_2$ (B)).

As shown in FIG. 8, the crystal structure represented by $TiO_2$ (B) has a structure in which a titanium ion 53 and an oxide ion 52 constitute each of backbone structure parts 51a, and the backbone structure parts 51a are disposed alternately. A void part 51b is formed between the backbone structure parts 51a. The void part 51b can be a host site for intercalate (insertion) of different atom species. Furthermore, it is considered that $TiO_2$ (B) also has host sites that can store and release different atom species on the crystal surface. $TiO_2$ (B) can store and release lithium ions reversibly by insertion and desorption of the lithium ions on these host sites.

When a lithium ion is inserted in the void part 51b, $Ti^{4+}$ that constitutes the backbone is reduced to $Ti_3^+$, whereby the electrical neutrality of the crystal is retained. Since $TiO_2$ (B) has one $Ti^{4+}$ per a chemical formula, it is theoretically possible to insert one lithium ion at the maximum between the layers. Therefore, the titanium oxide compound having a crystal structure of $TiO_2$ (B) can be represented by the general formula $Li_xTiO_2$ ($0 \leq x \leq 1$). In this case, a theoretical capacity of 335 mAh/g that is almost twice as large as those of the titanium dioxides described in the above-mentioned JP-A 2008-34368 (KOKAI) and JP-A 2008-117625 (KOKAI) can be obtained.

However, since $TiO_2$ (B) is a low temperature metastable phase that presents at a temperature lower than about 500° C., at least one sub-phase selected from anatase-type $TiO_2$ and $H_2Ti_8O_{17}$ is easily incorporated as an impurity phase during the synthesis. Since the impurity phase inhibits diffusion of lithium ions, the lithium ion conductivity of $TiO_2$ (B) is decreased. As a result, it is difficult to stably achieve a high capacity of 240 mAh/g or more in conventional $TiO_2$ (B).

Furthermore, $TiO_2$ (B) has a relatively low conductivity of lithium ion since it has a low diffusion velocity of lithium ions according to a factor other than the presence of impurity phases. It is considered that $TiO_2$ (B) has a conductivity of lithium ion, which is about two digit or more lower than that of, for example, a lithium-cobalt composite oxide that is used as a positive electrode active material. Therefore, since a non-aqueous electrolyte battery comprising a combination of $TiO_2$ (B) as a negative electrode active material and a lithium-cobalt composite oxide as a positive electrode active material limits to the low diffusion of the lithium ions in $TiO_2$ (B) in the adsorption and desorption of the lithium ions between the positive electrode and negative electrode, the large-current performance is decreased.

Meanwhile, the diffusion velocity of lithium ions means a combination of the intra-particle diffusion and particle boundary diffusion of the active material.

The active material for batteries according to the embodiment comprises a titanium composite oxide having a structure comprising a monoclinic β-type titanium composite oxide ($TiO_2$ (B)) as a main phase, and when an integral intensity of the main peak of the $TiO_2$ (B) according to a wideangle X-ray diffraction method having a CuKα-ray as an X-ray source is 100, the relative value of the integral intensity of the peak that presents the range of 2θ=25.1 to 25.5° attributed to at least one sub-phase selected from anatase-type $TiO_2$ and $H_2Ti_8O_{17}$, i.e., an impurity phase, is 30 or less. Such a titanium composite oxide can improve the ion conductivity of lithium since the amount of the impurity phase that inhibits diffusion of lithium ions is decreased, or is substantially zero. As a result, a high electric capacity that is inherent to $TiO_2$ (B) can be derived.

Furthermore, the titanium composite oxide has a large crystallite diameter, i.e., a crystallite diameter of 5 nm or more as calculated from the main peak of $TiO_2$ (B) obtained with the wideangle X-ray diffraction method. As a result, the diffusion velocity of the lithium ions in the titanium composite oxide is increased, whereby the ion conductivity of lithium can be improved. Therefore, when lithium ions are adsorbed and released between a positive electrode and a negative electrode by using the above-mentioned titanium composite oxide as the negative electrode active material and a lithium-cobalt composite oxide as the positive electrode active material in combination, the diffusion control of the lithium ions in the negative electrode against the positive electrode can be relaxed by the titanium composite oxide that has a high diffusion velocity of lithium ions, whereby the large-current performance can be improved.

As mentioned above, the ion conductivity and large-current performance of the titanium composite oxide can be improved by adjusting the crystallite diameter of the titanium composite oxide to 5 nm or more. A more preferable crystallite diameter of the titanium composite oxide is 20 nm or more. The upper limit of the crystallite diameter of the titanium composite oxide is 300 nm.

When the main peak integral intensity of the $TiO_2$ (B) according to a wideangle X-ray diffraction method is 100, by adjusting the relative value of the integral intensity of the peak that presents the range of 2θ=25.1 to 25.5° attributed to at least one sub-phase selected from anatase-type $TiO_2$ and $H_2Ti_8O_{17}$, i.e., an impurity phase, to 30 or less, the diffusion velocity of the lithium ions of the titanium composite oxide can be improved, and the ion conductivity and large-current performance can further be improved. The relative value of the integral intensity of the peak that presents the range of 2θ=25.1 to 25.5° attributed to the sub-phase(s) is more preferably 10 or less, further preferably 3 or less. It is preferable that the titanium composite oxide does not comprise impurity phases but has a structure that is substantially consisting of $TiO_2$ (B) that is a main phase. Therefore, the titanium composite oxide also comprises a state in which the impurity phase is at the detection limit or less, namely, zero.

It is preferable that the titanium composite oxide has a primary particle diameter of from 30 nm to 3 μm. When the primary particle diameter is 30 nm or more, handling becomes easy in industrial production. On the other hand, when the primary particle diameter is 3 μm or less, the diffusion distance of the lithium ions in a solid is shorten, whereby the large-current performance can be improved. The upper limit of the more preferable primary particle diameter is 1 μm.

It is preferable that the titanium composite oxide has a specific surface area of from 5 to 50 $m^2$/g. If the specific surface area is 5 $m^2$/g or more, storage and release sites for the lithium ions can be ensured sufficiently. On the other hand, if the specific surface area is 50 $m^2$/g or less, handling becomes easy in industrial production.

It is preferable that the titanium composite oxide comprises at least one element selected from P and B, and the at least one element is contained by an amount of from 0.01% to 3% by weight in total with respect to the total amount of the titanium composite oxide and the at least one element. It is preferable that the titanium composite oxide comprising the at least one element is in the form of particles, and the at least one element is present as an oxide inside of the particles or on the surfaces of the particles of the titanium composite oxide. Such a titanium composite oxide comprising at least one element selected from P and B can further decrease incorporation of an impurity phase, and can improve crystallinity to increase the crystallite diameter. As a result, a titanium composite oxide from which a capacity of 240 mAh/g or more can be taken out stably can be obtained. If the content of at least one element is lower than 0.01% by weight, the effect of increasing crystallinity becomes small. On the other hand, if the content of at least one element exceeds 3% by weight, the amounts of impurity phases: $P_2O_5$ and $B_2O_3$ are increased, and the electrical capacity may be decreased. Among the at least one element, P is preferable since it has higher effects mentioned above than those of B.

The content of the at least one element selected from P and B can be measured by an ICP emission spectroscopy. The measurement of the content of the above-mentioned element by the ICP emission spectroscopy can be performed, for example, by the following method. A battery is disassembled in a discharging state, an electrode (for example, a negative electrode) is removed, and the negative electrode layer thereof is deactivated in water. Thereafter, a titanium composite oxide in the negative electrode layer is extracted. The treatment for extraction can be performed by, for example, removing a conductive agent and a binder in the negative electrode layer by a heating treatment in the air. The extracted titanium composite oxide is measured off in a container, and subjected to acidic dissolution or alkaline dissolution to provide a measurement solution. The measurement solution is subjected to ICP emission spectroscopy in a measurement apparatus (for example, an SPS-1500V, manufactured by SII Nanotechology) to measure the content of the above-mentioned element.

The titanium composite oxide is allowed to comprise impurities other than the at least one element selected from P and B that is unavoidable in the production, by 1,000 ppm or less by weight.

Next, the method for the production of the active material for batteries according to the embodiment is explained.

First, an alkaline titanate compound such as $Na_2Ti_3O_7$, $K_2Ti_4O_9$ and $Cs_2Ti_5O_{12}$ is prepared as a starting raw material. The alkaline titanate compound can be synthesized by mixing a substance comprising Ti and a substance comprising an alkaline element such as Na, K and Cs at a predetermined ratio according to a general solid-phase reaction method. The procedure and crystal form for the synthesis of the starting raw material are not specifically limited. Meanwhile, potassium titanate of $K_2Ti_4O_9$ can be synthesized by, for example, a flux method.

The starting raw material is washed with pure water sufficiently to remove impurities from the alkaline titanate compound, and subjected to an acid treatment to exchange alkali cations to protons. The respective sodium ion, potassium ion and cesium ion in sodium titanate, potassium titanate and cesium titanate can be exchanged for proton without degrading the crystal structures. The proton exchange by an acid treatment is performed by, for example, adding hydrochloric acid having a concentration of 1 M to the starting raw material. It is desirable that the acid treatment is kept performed until the proton exchange is completed sufficiently. During the proton exchange, the pH may be adjusted by adding an alkaline solution or acidic solution to the solution. After completion of the proton exchange, washing with pure water is performed again.

It is preferable that the starting raw material is pulverized in a ball mill in advance before the proton exchange. By this pulverization, smooth proton exchange can be executed. The condition for the pulverization can be performed by using a zirconia ball having a diameter of about from 10 to 15 mm per a container of 100 $cm^2$, and rotating the zirconia ball at a rate of rotation of from 600 to 1,000 rpm for 1 to 3 hours. Pulverization for 1 hour or less is not preferable since the starting raw material is not pulverized sufficiently. Alternatively, pulverization for a long time as 3 hours or more is not preferable since a mechanochemical reaction proceeds and causes phase separation into compounds that are different from the objective product.

Smoother proton exchange can be executed by, for example, performing the proton exchange while applying oscillation such as ultrasonic, whereby a proton-exchanged form in a preferable state can be obtained.

Next, the product in which the proton exchange has been completed is washed with water and dried, whereby a proton-exchanged form as an intermediate product is synthesized. The proton-exchanged form is then heat-treated to produce a titanium composite oxide comprising $TiO_2$ (B) as a main phase.

A preferable heating temperature is from 250 to 500° C. When the heating temperature is lower than 250° C., the crystallinity is decreased significantly, the incorporation amount of the impurity phase of $H_2Ti_8O_{17}$ is increased, and the electronic capacity is decreased. On the other hand, when the heating temperature exceeds 500° C., the crystallinity is improved, and the $H_2Ti_8O_{17}$ phase that is the impurity phase is also decreased, whereas the incorporation amount of the anatase-type $TiO_2$ phase that is other impurity phase is increased, whereby the electronic capacity may be decreased. A more preferable heating temperature is from 300 to 400° C.

The time for the heating treatment may be from 30 minutes to 24 hours. A more preferable time for the heating treatment is from 1 to 3 hours at a temperature from 300 to 400° C.

Meanwhile, the above-mentioned alkaline titanate compound to which the at least one element selected from P and B has been added may also be used as the starting raw material. The starting raw material can be synthesized by mixing a substance to be at least one element mentioned above, a substance comprising Ti, and a substance comprising alkaline elements such as Na, K and Cs at a predetermined ratio according to a general solid-phase reaction method. The addition amount of the at least one element is preferably from 0.01% to 3% by weight in total with respect to the total amount of the obtained titanium composite oxide and the above-mentioned at least one element.

The above-mentioned at least one element acts as a sintering aid during the heating treatment, and thus an impurity phase such as $H_2Ti_8O_{17}$ becomes hard to remain. As a result, a titanium composite oxide having a large crystallite diameter and comprising a small amount of an impurity phase can be obtained.

The active material for batteries according to the embodiment can be used for not only the negative electrode mentioned below but also for a positive electrode, and when the active material is applied to either of the electrodes, it contributes to increasing of the capacity of the active material and the improvement of the large-current performance for use in a battery.

When the active material for batteries according to the embodiment is used for the positive electrode, metal lithium, lithium alloys or carbon-based material such as graphite and coke can be used for an active material for the negative electrode as a counter electrode.

Next, the non-aqueous electrolyte battery according to the embodiment is explained.

The non-aqueous electrolyte battery according to the embodiment comprises an outer case, a positive electrode housed in the outer case, a negative electrode housed in the outer case so as to spatially apart from the positive electrode through, for example, a separator, and comprising an active material, and a non-aqueous electrolyte that is filled in the outer case.

Hereinafter the outer case, negative electrode, positive electrode, separator and non-aqueous electrolyte, which are constitutional elements of the non-aqueous electrolyte battery, are explained in detail.

1) Outer Case

The outer case is made of a laminate film having a thickness of 0.5 mm or less. Alternatively, a metal container having a thickness of 1.0 mm or less is used for the outer case. It is more preferable that the metal container has a thickness of 0.5 mm or less.

Examples of the form of the outer case may include a flat type (thin type), a square type, a cylindrical type, a coin type, a button type and the like. Examples of the outer case may include outer cases for small batteries that are installed in portable electronic devices and the like, and outer cases for large batteries that are installed in two- or four-wheeled vehicles and the like according to the battery size.

As for the laminate film, a multilayer film comprising resin layers and a metal layer that is interposed therebetween is used. The metal layer is preferably an aluminum foil or aluminum alloy foil for weight saving. Examples of the resin layer include polymer materials such as polypropylene (PP), polyethylene (PE), nylon and polyethylene telephthalate (PET). The laminate film can be formed into the shape of the outer case by sealing by thermal fusion bonding.

The metal container is made of aluminum, an aluminum alloy or the like. As for the aluminum alloy, alloys comprising an element such as magnesium, zinc and silicon are preferable. When the alloy comprises a transition metal such as iron, copper, nickel and chromium, the amount thereof is preferably adjusted to 100 ppm or less.

2) Negative Electrode

The negative electrode comprises a current collector, and a negative electrode layer(s) formed on one surface or both surfaces of the current collector and comprising an active material, a conductive agent and a binder.

As the active material, an active material for batteries comprising the above-mentioned titanium composite oxide is used. The titanium composite oxide has a composition comprising a monoclinic β-type titanium composite oxide as a main phase, and when an integral intensity of the main peak of the monoclinic β-type titanium composite oxide according to a wideangle X-ray diffraction method having a CuKα-ray as an X-ray source is 100, the relative value of the integral intensity of the main peak that presents the range of 2θ=25.1 to 25.5° attributed to at least one sub-phase selected from anatase-type $TiO_2$ and $H_2Ti_8O_{17}$ is 30 or less. The titanium composite oxide has a crystallite diameter of 5 nm or more as calculated from the main peak of the monoclinic β-type titanium composite oxide obtained with the wideangle X-ray diffraction method.

As mentioned above, such an active material has a high diffusion velocity of lithium ions and a high ion conductivity of lithium. As a result, the non-aqueous electrolyte battery in which a negative electrode comprising a negative electrode layer containing this active material is incorporated can improve the large-current performance.

The conductive agent improves the current collecting performance of the active material, and suppresses the contact resistance with the current collector. Examples of the conductive agent include acetylene black, carbon black or graphite.

The binder can bind the active material and the conductive agent. Examples of the binder include polytetrafluoroethylene (PTFE), polyvinylidene fluoride (PVdF), fluorine-based rubbers or styrene-butadiene rubbers.

It is preferable that the active material, conductive agent and binder in the negative electrode layer are incorporated in the percentages of from 70% to 96% by weight, from 2% to 28% by weight and from 2% to 28% by weight, respectively. When the amount of the conductive agent is lower than 2% by weight, the current collecting performance of the negative electrode layer is decreased, whereby the large-current performance of the non-aqueous electrolyte battery may be decreased. Furthermore, when the amount of the binder is lower than 2% by weight, the binding property between the negative electrode layer and the current collector is decreased, whereby the cycle property may be decreased. On the other hand, it is preferable to adjust the conductive agent and binder to 28% by weight or less, respectively, in view of improvement of the capacity.

The current collector is preferably an aluminum foil or an aluminum alloy foil comprising elements such as Mg, Ti, Zn, Mn, Fe, Cu and Si, which is electrochemically stable at a potential range that is higher than 1.0 V vs Li/Li$^+$.

The negative electrode is prepared, for example, by suspending the active material, conductive agent and binder in a general solvent to prepare a slurry, applying the slurry on a current collector and drying, and subjecting the current collector to pressing. Alternatively, the negative electrode may be prepared by forming the active material, conductive agent and binder into pellets to form a negative electrode layer, and forming the negative electrode layer on the current collector.

3) Positive Electrode

The positive electrode comprises a current collector, and a positive electrode layer(s) formed on one surface or both surfaces of the current collector and comprising an active material, a conductive agent and a binder.

As the active material, for example, an oxide, a polymer and the like can be used.

As the oxide, for example, manganese dioxide ($MnO_2$), iron oxide, copper oxide and nickel oxide, which have adsorbed lithium, and lithium-manganese composite oxides (for example, $Li_xMn_2O_4$ or $Li_xMnO_2$), lithium-nickel composite oxides (for example, $Li_xNiO_2$), lithium-cobalt composite oxides ($Li_xCoO_2$), lithium-nickel-cobalt composite oxides (for example, $LiNi_{1-y}Co_yO_2$), lithium-manganese-cobalt composite oxides (for example, $Li_xMn_yCo_{1-y}O_2$), spinel-type lithium-manganese nickel composite oxides ($Li_xMn_{2-y}Ni_yO_4$), olipine-type lithium phosphorous oxides (for example, $Li_xFePO_4$, $Li_xFe_{1-y}Mn_yPO_4$, $Li_xCoPO_4$), iron sulfate ($Fe_2(SO_4)_3$) or vanadium oxide (for example, $V_2O_5$) can be used. It is preferable that x and y are $0<x\leq1$ and $0\leq y\leq1$, respectively.

As the polymer, for example, conductive polymer materials such as polyaniline and polypyrrole, or disulfide-based polymer materials can be used. As other polymers, sulfur (S) and carbon fluorides can also be used as the active material.

Preferable active materials may include lithium-manganese composite oxides ($Li_xMn_2O_4$), lithium-nickel composite oxides ($Li_xNiO_2$), lithium-cobalt composite oxides ($Li_xCoO_2$), lithium-nickel-cobalt composite oxides ($Li_xNi_{1-y}Co_yO_2$), spinel-type lithium-manganese-nickel composite oxides ($Li_xMn_{2-y}Ni_yO_4$), lithium-manganese-cobalt composite oxides ($Li_xMn_yCo_{1-y}O_2$) or lithium phosphate iron ($Li_xFePO_4$), which have a high positive electrode voltage. It is preferable that x and y are $0<x\leq1$ and $0\leq y\leq1$, respectively.

Further preferable active materials are lithium-cobalt composite oxides or lithium-manganese-composite oxides. Since these active materials have high ion conductivity, diffusion of the lithium ion in the positive electrode active material is hard to be a rate-controlling step when combined with the above-mentioned negative electrode active material. Therefore, the active materials are excellent in compatibility with the lithium-titanium composite oxide in the negative electrode active material.

The conductive agent enhances the current collecting performance of the active material to suppress the contact resistance with the current collector. Examples of the conductive agent include carbonaceous materials such as acetylene black, carbon black or graphite.

The binder binds the active material and the conductive agent. Examples of the binder include polytetrafluoroethylene (PTFE), polyvinylidene fluoride (PVdF) or fluorine-based rubbers.

It is preferable that the active material, conductive agent and binder in the positive electrode layer are incorporated in the percentages of from 80% to 95% by weight, from 3% to 18% by weight and from 2% to 17% by weight, respectively. By adjusting the amount of the conductive agent to 3% by weight or more, the above-mentioned effect can be exerted. By adjusting the amount of the conductive agent to 18% by weight or less, degradation of the non-aqueous electrolyte on the surface of the non-aqueous electrolyte under storage at a high temperature can be decreased. By adjusting the amount of the binder to 2% by weight or more, sufficient positive electrode intensity can be obtained. By adjusting the amount of the binder to 17% by weight or less, the incorporation amount of the binder, which is an insulating material in the positive electrode, can be decreased, whereby the internal resistance can be decreased.

It is preferable that the current collector is, for example, an aluminum foil or an aluminum alloy foil comprising elements such as Mg, Ti, Zn, Mn, Fe, Cu and Si.

The positive electrode is prepared, for example, by suspending the active material, conductive agent and binder in a general solvent to prepare a slurry, applying the slurry on a current collector and drying, and subjecting the current collector to pressing. Alternatively, the positive electrode may be prepared by forming the active material, conductive agent and binder into pellets to form a positive electrode layer, and forming the positive electrode layer on the current collector.

4) Non-Aqueous Electrolyte

Examples of the non-aqueous electrolyte may include liquid non-aqueous electrolytes that are prepared by dissolving an electrolyte in an organic solvent, gel-like non-aqueous electrolytes obtained by compounding a liquid electrolyte and a polymer material.

It is preferable that the liquid non-aqueous electrolyte is prepared by dissolving an electrolyte in an organic solvent at a concentration of from 0.5 to 2.5 mol/L.

Examples of the electrolyte may include lithium salts such as lithium perchlorate ($LiClO_4$), lithium phosphate hexafluoride ($LiPF_6$), lithium borate tetrafluoride ($LiBF_4$), lithium arsenic hexafluoride ($LiAsF_6$), lithium trifluorometasulfonate ($LiCF_3SO_3$) and lithium bistrifluoromethylsulfonylimito [$LiN(CF_3SO_2)_2$], or mixtures thereof. Electrolytes that are hardly oxidized even at a high potential are preferable, and $LiPF_6$ is the most preferable.

Examples of the organic solvent may include cyclic carbonates such as propylene carbonate (PC), ethylene carbonate (EC) and vinylene carbonate; chain carbonates such as diethyl carbonate (DEC), dimethyl carbonate (DMC) and methyl ethyl carbonate (MEC); cyclic ethers such as tetrahydrofuran (THF), 2methyltetrahydrofuran (2MeTHF) and dioxolane (DOX); chain ethers such as dimethoxyethane (DME) and diethoethane (DEE); or γ-butyrolactone (GBL), acetonitrile (AN) and sulfolane (SL). These organic solvents may be used solely or as a mixture.

Examples of the polymer material include polyvinylidene fluoride (PVdF), polyacrylonitrile (PAN) and polyethylene oxide (PEO).

Preferable organic solvents are mixed solvents that are obtained by mixing at least two or more selected from the group consisting of propylene carbonate (PC), ethylene carbonate (EC) and (diethyl carbonate [DEC]), or γ-butyrolactone (GBL).

5) Separator

Examples of the separator may include porous films comprising polyethylene, polypropylene, cellulose or polyvinylidene fluoride (PVdF), or nonwoven fabrics made of synthetic resins. A preferable porous film is made of polyethylene or polypropylene, and the film can improve safeness since it can be molten at a certain temperature to block a current.

Figure 2:
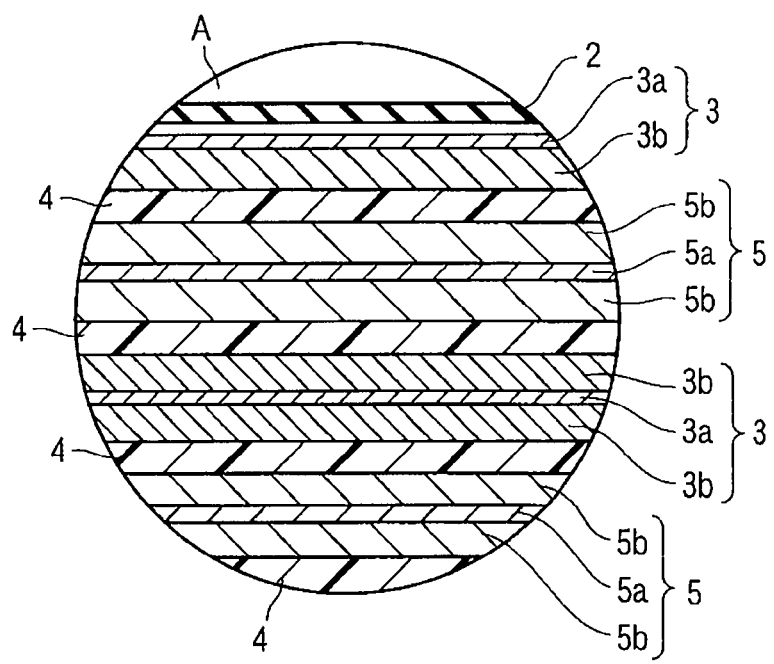
FIG. 2 is an enlarged cross-sectional drawing of the part A in FIG. 1.

Next, the non-aqueous electrolyte battery (for example, a flat-type non-aqueous electrolyte battery comprising an outer case composed of a laminate film) according to the embodiment is explained more specifically with referring to FIGS. 1 and 2. FIG. 1 is a cross-sectional view of a thin-type non-aqueous electrolyte battery, and FIG. 2 is an enlarged cross-sectional view of the part A in FIG. 1. The respective drawings are schematic drawings for explaining on and promoting understanding toward the invention, and although some of the shape, size, ratio and the like thereof are different from those of an actual apparatus, these can be suitably modified in design with referring to the following explanations and known techniques.

A flat, spiral electrode group 1 is housed in a sac-like outer case 2 composed of a laminate film comprising two resin layers and an aluminum foil interposed therebetween. The flat, spiral electrode group 1 is formed by winding-up a laminate in which a negative electrode 3, a separator 4, a positive electrode 5 and a separator 4 are laminated in this order from the outer side in a spiral shape and subjecting the laminate to press forming. As shown in FIG. 2, the negative electrode 3 on the outermost shell has a constitution in which a negative electrode layer 3b is formed on one surface on the inner surface side of a negative electrode current collector 3a. Other negative electrodes 3 are constituted by forming negative electrode layers 3b on the both surfaces of a negative electrode current collector 3a. The active material in the negative electrode layer 3b comprises a titanium composite oxide. The titanium composite oxide has a composition comprising a monoclinic β-type titanium composite oxide as a main phase, and when an integral intensity of the main peak of the monoclinic β-type titanium composite oxide according to a wide-angle X-ray diffraction method having a CuKα-ray as an X-ray source is 100, the relative value of the integral intensity of the main peak that presents the range of 2θ=25.1 to 25.5° attributed to at least one sub-phase selected from anatase-type $TiO_2$ and $H_2Ti_8O_{17}$ is 30 or less. The titanium composite oxide has a crystallite diameter of 5 nm or more as calculated from the main peak of the monoclinic β-type titanium composite oxide obtained with the wideangle X-ray diffraction method. A positive electrode 5 is constituted by forming positive electrode layers 3b on the both surfaces of a positive electrode current collector 5a.

In the vicinity of the circumferential end of the flat, spiral electrode group 1, a negative electrode terminal 6 is connected to the negative electrode current collector 3a of the negative electrode 3 of the outermost shell, and a positive electrode terminal 7 is connected to the positive electrode current collector 5a of the positive electrode 5 on the inner side. These negative electrode terminal 6 and positive electrode terminal 7 are extended outward from the opening of the sac-like outer case 2. For example, a liquid non-aqueous electrolyte is injected from the opening of the sac-like outer case 2. By interposing the negative electrode terminal 6 and positive electrode terminal 7 in the opening of the sac-like outer case 2 and heat-sealing, the flat, spiral electrode group 1 and liquid non-aqueous electrolyte are sealed off completely.

The negative electrode terminal is made of a material having electric stability and conductivity at a potential in the range of 1.0 to 3.0 V vs Li/Li$^+$. Specific examples may include aluminum, or aluminum alloys comprising elements such as Mg, Ti, Zn, Mn, Fe, Cu and Si. The negative electrode terminal is preferably composed of the same material as that of the negative electrode current collector so as to decrease contact resistance against the negative electrode current collector.

The positive electrode terminal is made of a material having electrical stability and conductivity of a potential in the range of 3.0 to 4.25 V vs Li/Li$^+$. Specific examples may include aluminum, or aluminum alloys comprising elements such as Mg, Ti, Zn, Mn, Fe, Cu and Si. The positive electrode terminal is preferably composed of the same material as that of the positive electrode current collector so as to decrease a contact resistance against the positive electrode current collector.

Next, the battery pack of the embodiment is explained in detail.

The battery pack of the embodiment has a plurality of the above-mentioned non-aqueous electrolyte batteries (unit cells), and the respective unit cells are disposed electrically in series, in parallel, or in series and parallel.

Such a battery pack has excellent cycle property.

Since the titanium composite oxide included in the negative electrode active material comprises little incorporation of an impurity phase and has high crystallinity, a non-aqueous electrolyte battery using this titanium composite oxide can improve the large-current performance and charge-discharge cycle performance. As a result, the battery pack incorporating a plurality of such batteries can improve the charge-discharge cycle performance even charging and discharging are performed under a large current.

Next, the battery pack of the embodiment is explained in detail with referring to FIG. 3 and FIG. 4. The flat-type non-aqueous electrolyte battery shown in FIG. 1 is used as a unit cell.

A plurality of unit cells 21 are stacked so that a negative electrode terminal 6 and positive electrode terminal 7 that are extended to outside are aligned in the same direction, and are bound by an adhesive tape 22 to constitute a battery module 23. As shown in FIG. 4, the unit cells 21 are connected electrically in series with each other.

A printed wiring board 24 is disposed opposing to the side surface of the unit cells 21 from which the negative electrode terminal 6 and positive electrode terminal 7 are extended. As shown in FIG. 4, a thermistor 25, a protective circuit 26, and a terminal 27 for carrying a current to an external device are mounted on the printed wiring board 24. In addition, an insulating board (not depicted) is attached to the surface of the protective circuit substrate 24 opposing to the battery module 23 so as to avoid unnecessary connection with the wiring of the battery module 23.

A positive electrode-side lead 28 is connected to the positive electrode terminal 7 that is positioned at the lowermost layer of the battery module 23, and the tip thereof is inserted to and electrically connected to a positive electrode-side connector 29 of the printed wiring board 24. A negative electrode-side lead 30 is connected to the negative electrode terminal 6 that is positioned at the uppermost layer of the battery module 23, and the tip thereof is inserted to and electrically connected to a negative electrode-side connector 31 of the printed wiring board 24. These connectors 29 and 31 are connected to a protective circuit 26 through wirings 32 and 33 that are formed on the printed wiring board 24.

The thermistor 25 is used for detecting the temperature of the unit cells 21, and the detection signal thereof is sent to the protective circuit 26. The protective circuit 26 can break a plus-side wiring 34a and a minus-side wiring 34b between the protective circuit 26 and the terminal 27 for carrying a current to an external device under a predetermined condition. The predetermined condition refers to, for example, the time at which the detection temperature of the thermistor 25 reaches a predetermined temperature or more. Furthermore, the predetermined condition refers to the time at which the over-charge, over-discharge, over-current or the like of the unit cells 21 is detected. The detection of over-charge or the like is performed on each unit cell 21 or the entirety of the unit cells 21. When detection is performed on each unit cell 21, a battery voltage may be detected, or a positive electrode potential or negative electrode potential may be detected. In the latter case, a lithium electrode that is used as a reference electrode is inserted into each unit cell 21. In the case of FIG. 3 and FIG. 4, wirings 35 for detection of a voltage are connected to the respective unit cells 21, and detection signals are sent to the protective circuit 26 through these wirings 35.

Protective sheets 36 made of a rubber or resin are disposed respectively on the three side surfaces of the battery module 23 except for the side surface from which the positive electrode terminal 7 and negative electrode terminal 6 protrude.

The battery module 23 is housed in a housing container 37 together with the respective protective sheets 36 and the printed wiring board 24. Namely, the protective sheets 36 are disposed respectively on the both inner surfaces in the longitudinal side direction and the inner surface in the short side direction of the housing container 37, and the printed wiring board 24 is disposed on the inner surface on the opposite side in the short side direction. The battery module 23 is positioned in a space surrounded by the protective sheets 36 and the printed wiring board 24. A lid 38 is attached to the upper surface of the housing container 37.

Alternatively, the battery module 23 may be fixed by using a heat shrink tape instead of the adhesive tape 22. In this case, the protective sheets are disposed on both side surfaces of the battery module, the battery module is wound around a heat shrink tape, and the heat shrink tape is shrank by heating to bind the battery module.

Although an embodiment in which the unit cells 21 are connected in series is shown in FIG. 3 and FIG. 4, the unit cells may be connected in parallel, or series connection and parallel connection may be combined so as to increase a battery capacity. Assembled battery packs may further be connected in series or parallel.

Furthermore, the embodiment of the battery pack is suitably changed according to use. Preferable use of the battery pack is one in which excellent cycle performance is shown when a large current is drawn. Specific examples may include uses in power sources for digital cameras, and in-car uses in two or four-wheeled hybrid battery automobiles, two or four-wheeled battery automobiles, motor assisted bicycles and the like. Specifically, in-car uses are preferable.

As mentioned above, a non-aqueous electrolyte battery having excellent high temperature property can be obtained by using a mixing solvent obtained by mixing at least two or more selected from the group consisting of propylene carbonate (PC), ethylene carbonate (EC) and diethyl carbonate (DEC), or a non-aqueous electrolyte comprising γ-butyrolactone (GBL). A battery pack comprising a battery module comprising a plurality of such non-aqueous electrolyte batteries is specifically preferable for in-car uses.

Hereinafter Examples are explained. Unless going beyond the gist of the present invention, the present invention is not limited by the Examples described below.

Example 1

Preparation of Positive Electrode

First, 90% by weight of a lithium-nickel composite oxide ($LiNi_{0.82}Co_{0.15}Al_{0.03}O_2$) powder as a positive electrode active material, 5% by weight of acetylene black as a conductive agent, and 5% by weight of polyvinylidene fluoride (PVdF) were added to N-methylpyrrolidone (NMP) and mixed to provide a slurry, and the slurry was applied on both surfaces of a current collector composed of an aluminum foil having a thickness of 15 μm, dried and pressed to prepare a positive electrode having an electrode density of 3.15 g/cm³.

Preparation of Titanium Composite Oxide

First, potassium carbonate ($K_2CO_3$) and an anatase-type titanium oxide ($TiO_2$) were mixed, and calcined at 1,000° C. for 24 hours to synthesize $K_2Ti_4O_9$. The obtained $K_2Ti_4O_9$ was dry-grinded with zirconia balls to adjust the granularity, and washed with pure water to provide a proton exchange precursor. The obtained proton exchange precursor was put into a hydrochloric acid solution having a concentration of 1 M, and subjected to ultrasonic stirring in an environment at 25° C. for 1 hour. This operation was repeated 12 times, in which hydrochloric acid was replaced in each case, and thereafter cleaning was performed to provide a proton exchange form. Next, the obtained proton exchange form was subjected to calcination in the air at 350° C. for 3 hours to produce a titanium composite oxide.

For the obtained titanium composite oxide, the crystallite diameter and the intensity ratio of the main peak were measured.

Namely, according to the above-mentioned measurement method, a wideangle X-ray diffraction pattern using Cu—Kα of the titanium composite oxide was obtained. The obtained X-ray diffraction pattern is shown in FIG. 5.

The crystallite diameter of the titanium composite oxide was obtained according to the above-mentioned calculation method from the half width of the X-ray diffraction peak of the plane (110) having a diffraction angle (2θ) of about 24.8° of the monoclinic β-type titanium composite oxide. The crystallite diameter of the titanium composite oxide was 15 nm. Meanwhile, in the calculation of the half width of the diffraction peak, it is necessary to correct the line width according to the optical system of the diffraction apparatus, and a standard silicon powder was used for this correction.

Figure 5:
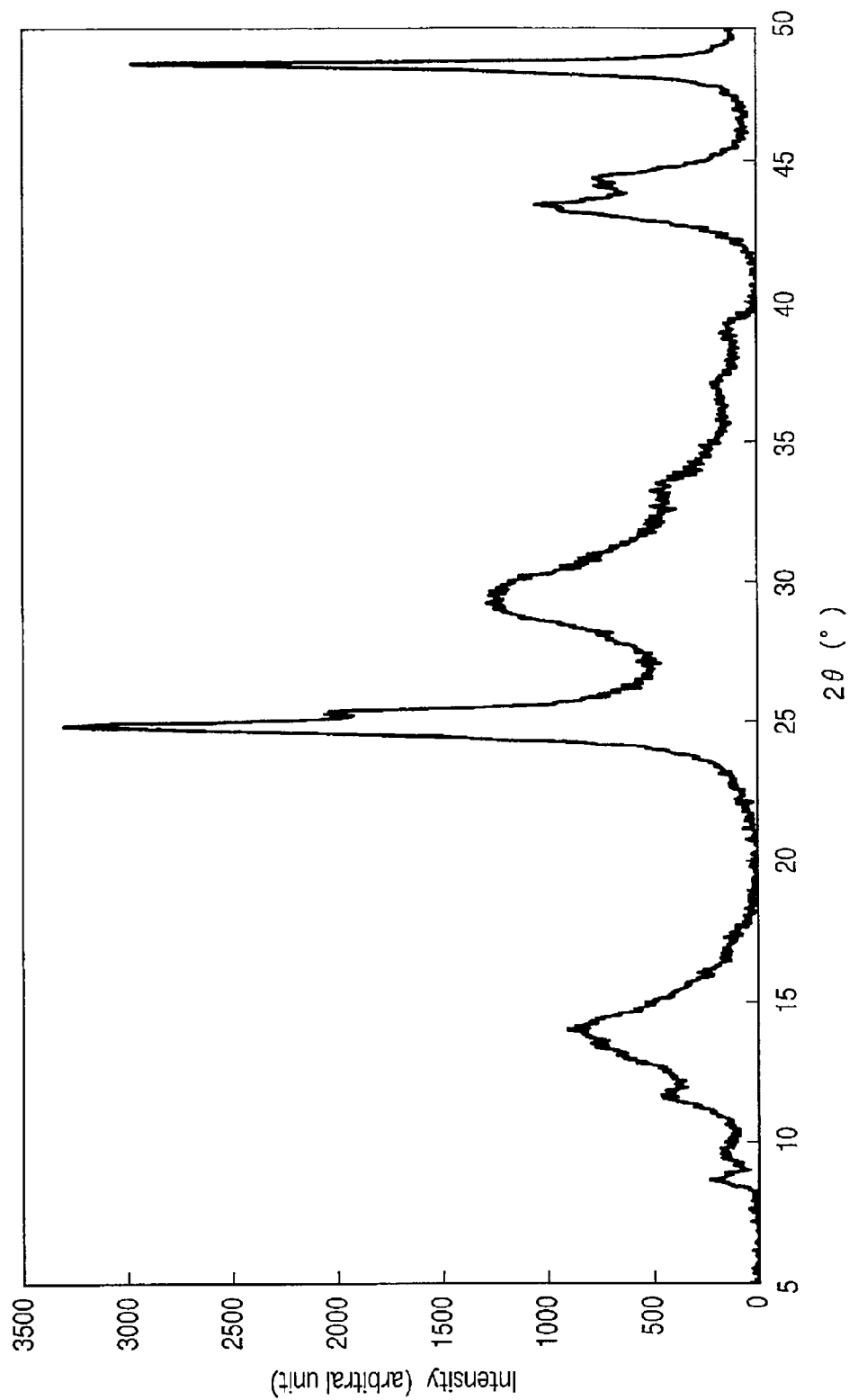
FIG. 5 is a drawing showing the X-ray diffraction pattern of a titanium composite oxide of Example 1.

When the peak integral intensity of the main peak of the monoclinic β-type titanium composite oxide 3.59 Å (2θ: 24.8°) that was calculated from the X-ray diffraction pattern shown in FIG. 5 by the above-mentioned method was 100, the relative value of the integral intensity of the main peak that presents the range of 2θ=25.1 to 25.5° attributed to anatase-type $TiO_2$ and $H_2Ti_8O_{17}$, respectively, was 23.

Preparation of Negative Electrode

90% by weight of the obtained titanium composite oxide powder, 5% by weight of acetylene black and 5% by weight of polyvinylidene fluoride (PVdF) were added to N-methylpyrrolidone (NMP) and mixed to prepare a slurry. The slurry was applied to both surfaces of a current collector composed of an aluminum foil having a thickness of 15 μm, dried and pressed to prepare a negative electrode having an electrode density of 2.0 g/cm³.

Preparation of Electrode Group

The positive electrode, a separator composed of a porous film made of polyethylene having a thickness of 25 μm, the negative electrode and a separator were sequentially laminated in this order, and wound-up in a spiral shape. This was heat-pressed at 90° C. to prepare a flat, spiral electrode group having a width of 30 mm and a thickness of 3.0 mm. The obtained electrode group was housed in a pack composed of a laminate film, and subjected to vacuum drying at 80° C. for 24 hours. The laminate film is constituted by forming polypropylene layers on both surfaces of an aluminum foil having a thickness of 40 μm, and the total thickness thereof is 0.1 mm.

Preparation of Liquid Non-Aqueous Electrolyte

Ethylene carbonate (EC) and ethyl methyl carbonate (EMC) were mixed at a volume ratio of 1:2 to provide a mixed solvent. $LiPF_6$ as an electrolyte was dissolved by 1 M in the mixed solvent to prepare a liquid non-aqueous electrolyte.

Production of Non-Aqueous Electrolyte Secondary Battery

The liquid non-aqueous electrolyte was injected into the laminate film pack housing the electrode group, and the pack was completely sealed off by heat sealing to produce a non-aqueous electrolyte secondary battery having the structure as shown in FIG. 1 and having a width of 35 mm, a thickness of 3.2 mm and a height of 65 mm.

Examples 2 to 6 and Comparative Example 1

Titanium composite oxides were synthesized in a similar method to that of Example 1, except that the calcination temperature of the proton exchange form was changed to those described in the following Table 1. Non-aqueous electrolyte secondary batteries were produced in a similar method to that of Example 1, except that these titanium composite oxides were used as negative electrode active substances. Meanwhile, the relative values of the integral intensity and the crystallite diameters of the titanium composite oxides that were used in Examples 2 to 6 and Comparative Example 1 shown in the following Table 1 were calculated from a wideangle X-ray diffraction pattern using Cu—Kα, which was prepared in a similar manner to that in Example 1. The X-ray diffraction pattern of the titanium composite oxide used in Comparative Example 1 is shown in FIG. 6.

For the respective batteries of Examples 1 to 6 and Comparative Example 1, a 0.2 C discharge capacity and a 2 C discharge capacity were measured under an environment of 25° C., and the ratio (%) of the 2 C discharge capacity against the 0.2 C discharge capacity was obtained as a capacity maintenance rate (%). The results are shown in the following Table 1.

Furthermore, single electrodes were prepared from the negative electrodes that were used for the batteries of Examples 1 to 6 and Comparative Example 1 and a counter electrode composed of a lithium metal. Lithium ions were stored (charged) in the negative electrode of the single electrode up to 1 V (Li/Li$^+$) at a current value of 0.1 mA/cm$^2$, and lithium ions were released up to 3 V (Li/Li$^+$) at a current value of 0.1 mA/cm$^2$. The discharged amount of electricity at that time was converted to an amount of electricity per a unit weight of lithium titanate that was an active material for the negative electrode. The converted values are shown in the following Table 1 as negative electrode capacities.

TABLE 1

| | Calcination temperature (° C.) | Relative value of integral intensity | Crystallite diameter (nm) | Negative electrode capacity (mAh/g) | Capacity retention rate (%) |
|---|---|---|---|---|---|
| Comparative Example 1 | 250 | 51 | 9 | 158 | 70 |
| Example 1 | 350 | 23 | 15 | 210 | 85 |
| Example 2 | 300 | 30 | 10 | 205 | 84 |
| Example 3 | 400 | 20 | 17 | 220 | 87 |
| Example 4 | 450 | 17 | 20 | 220 | 87 |
| Example 5 | 500 | 12 | 25 | 215 | 85 |
| Example 6 | 600 | 10 | 30 | 210 | 84 |

As is apparent from Table 1, it is understood that the batteries of Examples 1 to 6 for which titanium composite oxides each having a relative value of the integral intensity of 30 or less and a crystallite diameter of 5 nm or more were used as negative electrode active materials show higher negative electrode capacities and higher capacity retention rates (fine large-current performances) than those of the battery of Comparative Example 1 for which a titanium composite oxide in which any one of the above-mentioned relative value of the integral intensity and crystallite diameter was out of the above-mentioned range was used as a negative electrode active material.

Example 7

A non-aqueous electrolyte secondary battery was prepared in a similar manner to that of Example 1, except that the titanium composite oxide synthesized by the following method was used as a negative electrode active material.

Phosphorous oxide ($P_2O_5$), boron oxide ($B_2O_3$), potassium carbonate ($K_2CO_3$) and anatase-type titanium oxide ($TiO_2$) were mixed, and calcined at 1,000° C. for 24 hours to provide $K_2Ti_4O_9$ comprising P and B. The obtained $K_2Ti_4O_9$ was dry-grinded with zirconia balls to adjust the granularity, and washed with pure water to provide a proton exchange precursor. The obtained proton exchange precursor was put into a hydrochloric acid solution having a concentration of 1 M, and ultrasonic stirring was performed under an environment of 25° C. for 1 hour. This operation was repeated 12 times, in which hydrochloric acid was replaced in each case, and thereafter washing was performed to provide a proton exchange form. Next, the obtained proton exchange form was calcined in the air at 350° C. for 3 hours to synthesize a titanium composite oxide.

Figure 7:
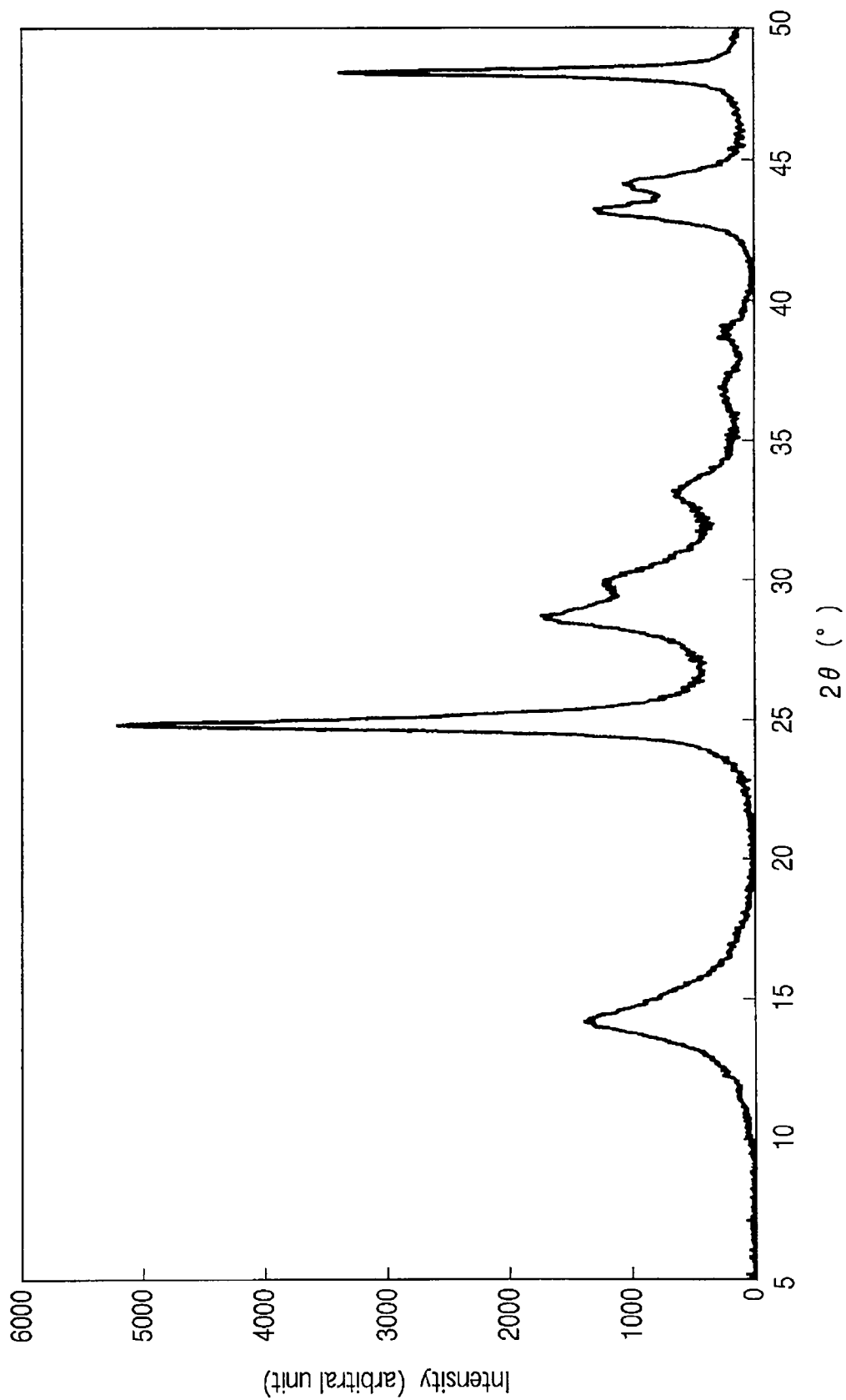
FIG. 7 is a drawing showing the X-ray diffraction pattern of a titanium composite oxide of Example 7.

The amounts of P and B in the obtained titanium composite oxide were measured by the above-mentioned ICP analysis. As a result, the amounts of P and B were 0.230% by weight and 0.010% by weight, respectively. The wideangle X-ray diffraction pattern of the obtained titanium composite oxide using Cu—Kα is shown in FIG. 7. From this wideangle X-ray diffraction pattern, the relative value of the integral intensity of the main peak that presents the range of 2θ=25.1 to 25.5° attributed to the anatase-type $TiO_2$ and $H_2Ti_8O_{17}$, respectively, when the peak integral intensity at 3.59 Å (2θ: 24.8°) that is the main peak of the monoclinic β-type titanium composite oxide is 100, and the crystallite diameter of the titanium composite oxide were obtained in similar manners to those of Example 1. As a result, the relative value of the integral intensity and the crystallite diameter were 3 or less and 25 nm, respectively.

Examples 8 to 16 and Comparative Example 2

Titanium composite oxides were synthesized in a similar manner to that of Example 7, except that the amounts of P and B (amounts with respect to the total amount of the titanium composite oxide and P and B) were in the ratios shown in the following Table 2. Non-aqueous electrolyte secondary batteries were produced in a similar manner to that of Example 1, except that these titanium composite oxides were used as negative electrode active materials. In addition, the relative values of the integral intensity and crystallite diameters of the titanium composite oxides used for Examples 8 to 16 and Comparative Example 2 shown in the following Table 2 were calculated from wideangle X-ray diffraction patterns using Cu—Kα, which were prepared in a similar manner to that of Example 1.

For each of the batteries of Examples 7 to 16 and Comparative Example 2, a 0.2 C discharge capacity and a 2 C discharge capacity were measured under an environment of 25° C., and the ratio (%) of the 2 C discharge capacity against the 0.2 C discharge capacity was obtained as a capacity retention rate (%). The results are shown in the following Table 2.

Furthermore, single electrodes were prepared from the negative electrodes that were used for the batteries of Examples 7 to 16 and Comparative Example 2 and a counter electrode composed of a lithium metal. Lithium ions were stored (charged) in the negative electrode of the single electrode up to 1 V (Li/Li$^+$) at a current value of 0.1 mA/cm$^2$, and lithium ions were released up to 3 V (Li/Li$^+$) at a current value of 0.1 mA/cm$^2$. The discharged amount of electricity at that time was converted to an amount of electricity per a unit weight of lithium titanate that was an active material for the negative electrode. The converted values are shown in the following Table 2 as negative electrode capacities.

TABLE 2

| | Amount of P (wt %) | Amount of B (wt %) | Amount of P + B (wt %) | Calcination temperature (° C.) | Relative value of integral intensity | Crystallite diameter (nm) | Negative electrode capacity (mAh/g) | Capacity retention rate (%) |
|---|---|---|---|---|---|---|---|---|
| Example 7 | 0.230 | 0.010 | 0.240 | 350 | <3 | 25 | 254 | 91 |
| Example 8 | 0.010 | — | 0.010 | 350 | 7 | 15 | 225 | 89 |

TABLE 2-continued

|  | Amount of P (wt %) | Amount of B (wt %) | Amount of P + B (wt %) | Calcination temperature (° C.) | Relative value of integral intensity | Crystallite diameter (nm) | Negative electrode capacity (mAh/g) | Capacity retention rate (%) |
|---|---|---|---|---|---|---|---|---|
| Example 9 | 0.050 | — | 0.050 | 350 | 5 | 17 | 230 | 90 |
| Example 10 | 0.100 | — | 0.100 | 350 | <3 | 18 | 241 | 92 |
| Example 11 | 0.230 | — | 0.230 | 350 | <3 | 22 | 253 | 93 |
| Example 12 | 1.051 | — | 1.051 | 400 | <3 | 27 | 243 | 94 |
| Example 13 | 2.953 | — | 2.953 | 400 | <3 | 20 | 210 | 92 |
| Comparative Example 2 | 4.931 | — | 4.931 | 400 | 36 | 9 | 138 | 69 |
| Example 14 | 0.225 | 0.023 | 0.248 | 350 | <3 | 25 | 248 | 91 |
| Example 15 | 0.228 | 0.250 | 0.478 | 350 | <3 | 27 | 244 | 92 |
| Example 16 | — | 0.245 | 0.245 | 350 | <3 | 19 | 237 | 90 |

As is apparent from Table 2, it is understood that the batteries of Examples 7 to 16 for which titanium composite oxides each comprising a predetermined amount of at least one element selected from P and B and having a relative value of the integral intensity of 30 or less and a crystallite diameter of 5 nm or more were used as negative electrode active materials show higher negative electrode capacities and higher capacity retention rates (fine large-current performances) than those of the battery of Comparative Example 2 for which a titanium composite oxide in which the content of the element (P) exceeded 3% by weight was used as a negative electrode active material. Furthermore, it is understood that the batteries of Examples 7 to 16 show further higher capacity retention rates (fine large-current performances) than those of the batteries of Examples 1 to 6 that were free from the above-mentioned elements (P, B).

While the embodiments of the present invention have been described, the present invention is not limited by these embodiments and can be modified in various ways within the category of the gist of the invention described in the claims. Furthermore, the present invention can be modified in various ways in the scope that does not depart from the gist of the invention in carrying out the invention. In addition, various inventions can be formed by suitably combining a plurality of the constitutional elements disclosed in the above-mentioned embodiments.

What is claimed is:

1. An active material, comprising a titanium composite oxide, wherein:
   the titanium composite oxide comprises a monoclinic β-type titanium composite oxide as a main phase, such that when an integral intensity of a main peak of the monoclinic β-type titanium composite oxide obtained with a wideangle X-ray diffraction method having a CuKα-ray as an X-ray source is 100, a relative value of an integral intensity of a main peak that presents the range of 2θ=25.1 to 25.5° attributed to a sub-phase of $H_2Ti_8O_{17}$ is 30 or less, the main peak being an X-ray diffraction peak of the plane (110) in the monoclinic β-type titanium composite oxide; and
   the titanium composite oxide has a crystallite diameter of 5 nm or more as calculated from the main peak of the monoclinic β-type titanium composite oxide obtained with the wideangle X-ray diffraction method.

2. The active material of claim 1, wherein the titanium composite oxide further comprises at least one element selected from the group consisting of P and B in an amount of from 0.01% to 3% by weight with respect to a total amount of the titanium composite oxide and the at least one element.

3. The active material of claim 2, wherein the titanium composite oxide comprising the at least one element is in the form of particles, and the at least one element is present as an oxide inside of the particles or on the surfaces of the particles of the titanium composite oxide.

4. The active material of claim 2, wherein the titanium composite oxide exhibits a discharge capacity of 210 mAh/g or more, based on a discharged amount of electricity per a unit of weight of a corresponding lithium titanate as the active material.

5. The active material of claim 2, wherein the titanium composite oxide comprises 1,000 ppm or less by weight of impurities other than the at least one element selected from the group consisting of P and B.

6. A non-aqueous electrolyte battery, comprising:
   an outer case;
   a positive electrode housed in the outer case;
   a negative electrode housed in the outer case, so as to be spatially apart from the positive electrode, and comprising an active material containing a titanium composite oxide; and
   a non-aqueous electrolyte contained in the outer case,
   wherein:
   the titanium composite oxide comprises a monoclinic β-type titanium composite oxide as a main phase, such that when an integral intensity of a main peak of the monoclinic β-type titanium composite oxide obtained with a wideangle X-ray diffraction method having a CuKα-ray as an X-ray source is 100, a relative value of an integral intensity of the main peak that presents the range of 2θ=25.1 to 25.5° attributed to a sub-phase of $H_2Ti_8O_{17}$ is 30 or less, the main peak being an X-ray diffraction peak of the plane (110) in the monoclinic β-type titanium composite oxide; and
   the titanium composite oxide has a crystallite diameter of 5 nm or more as calculated from the main peak of the monoclinic β-type titanium composite oxide obtained with the wideangle X-ray diffraction method.

7. The battery of claim 6, wherein the titanium composite oxide further comprises at least one element selected from the group consisting of P and B in an amount of from 0.01% to 3% by weight in total with respect to a total amount of the titanium composite oxide and the at least one element.

8. The battery of claim 7, wherein the titanium composite oxide comprising the at least one element is in the form of particles, and the at least one element is present as an oxide inside of the particles or on the surfaces of the particles of the titanium composite oxide.

9. The battery of claim 6, wherein the positive electrode comprises a lithium-nickel composite oxide or a lithium-manganese composite oxide.

10. The battery of claim 6, wherein the outer case is formed from a laminate film.

11. A battery pack, comprising a plurality of the non-aqueous electrolyte battery of claim 6, wherein respective non-aqueous electrolyte batteries are electrically connected in series, in parallel or in series and in parallel.

12. The battery pack of claim 11, further comprising a protective circuit that can detect the voltages of the respective non-aqueous electrolyte batteries.

13. The non-aqueous electrolyte battery of claim 7, wherein the titanium composite oxide exhibits a discharge capacity of 210 mAh/g or more, based on a discharged amount of electricity per a unit of weight of a corresponding lithium titanate as the active material.

14. The non-aqueous electrolyte battery of claim 7, wherein the titanium composite oxide comprises 1,000 ppm or less by weight of impurities other than the at least one element selected from the group consisting of P and B.

* * * * *